Nov. 17, 1959  A. R. BROWN  2,913,063
STEERING AND DRIVING MECHANISM FOR MATERIAL HANDLING TRUCKS
Filed Sept. 20, 1954  3 Sheets-Sheet 1
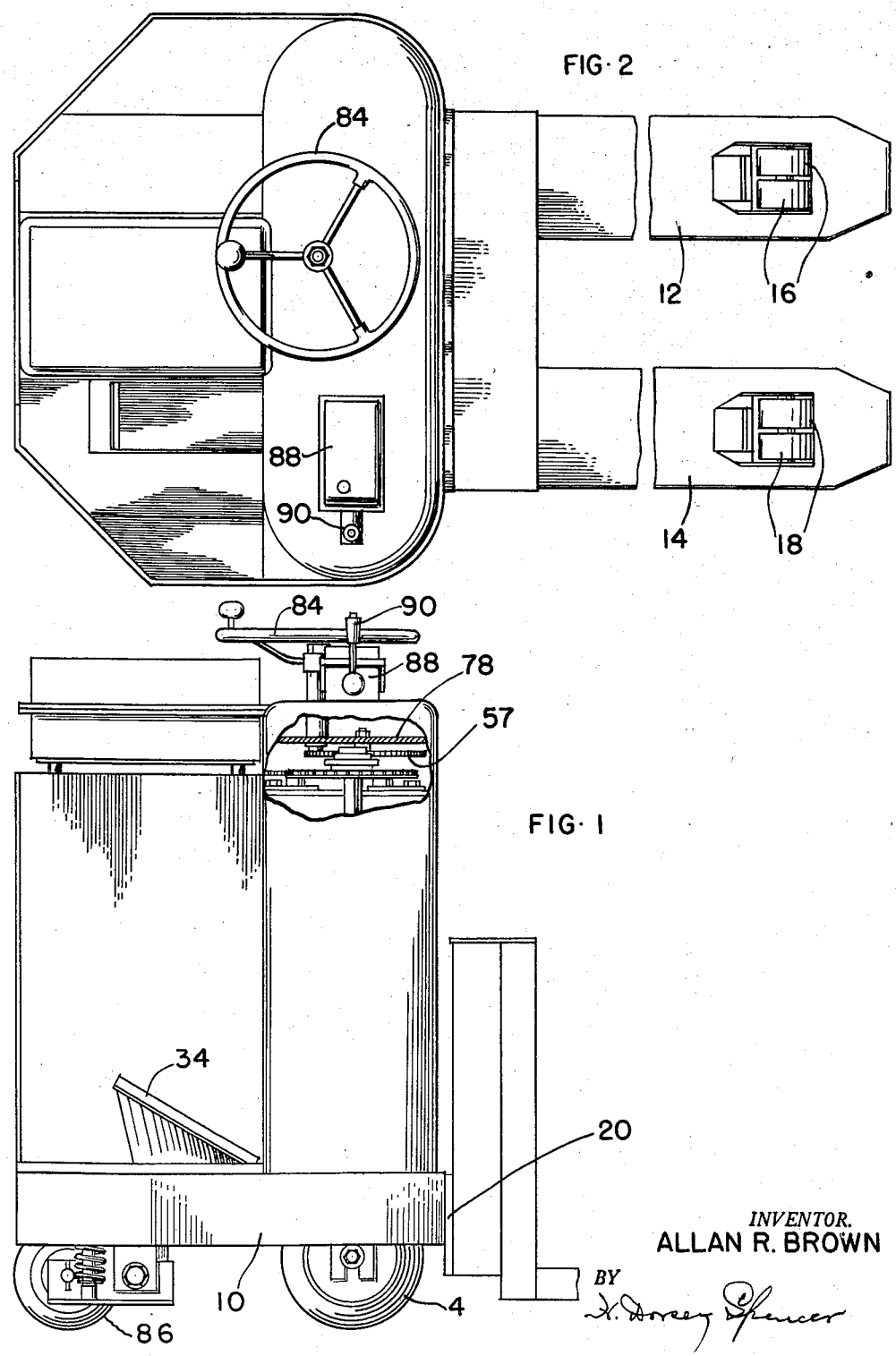
INVENTOR.
ALLAN R. BROWN

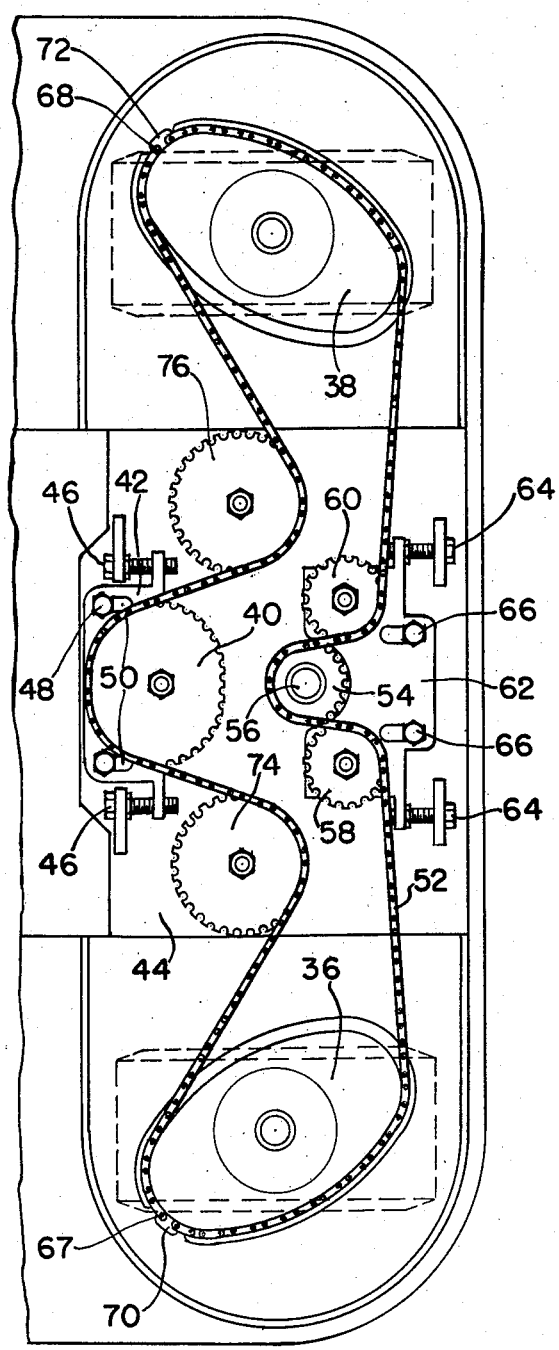

Nov. 17, 1959 　　　A. R. BROWN　　　2,913,063
STEERING AND DRIVING MECHANISM FOR MATERIAL HANDLING TRUCKS
Filed Sept. 20, 1954　　　　　　　　　　3 Sheets-Sheet 3

INVENTOR.
ALLAN R. BROWN
BY

United States Patent Office 2,913,063
Patented Nov. 17, 1959

2,913,063

STEERING AND DRIVING MECHANISM FOR MATERIAL HANDLING TRUCKS

Allan R. Brown, Greene, N.Y., assignor to The Raymond Corporation, Greene, N.Y., a corporation of New York Application September 20, 1954, Serial No. 457,061

3 Claims. (Cl. 180—42)

This invention relates to power-driven material handling trucks and has for its general object such a reorganization and modification of the driving and steering mechanisms of these trucks as to increase materially the tractive effort which they exert without in any way reducing the desired maneuverability and stability of the trucks, especially in narrow aisles and other restricted spaces.

In U.S. Letters Patent No. 2,564,002 to C. D. Gibson, granted August 14, 1951, owned by the assignee of the present invention, is disclosed a power-driven, operator-riding material handling truck of marked stability and unusual maneuverability, the combination of maneuverability and stability being made possible by offsetting to one side of the axis of symmetry of the truck a combined driving and steering wheel, steerable through an angle of substantially 200°, and providing a stabilizing caster on the other side of the axis of symmetry which will adapt itself to the steering movements of the combined steering and driving wheel. As stated in said Letters Patent, column 8, lines 19 and 20, the overall angle through which the steering and driving wheel there shown is permitted to turn is about 200°, this being sufficient for the desired maneuverability.

If one understakes to substitute another steering wheel, or even a combined steering and driving wheel, for the caster shown in said Patent No. 2,564,002, difficulty is experienced in maintaining the maneuverability of the truck because of the reduction in the angle of swing of the steering wheels when they are interconnected by any conventional two-wheel steering control, such as the standard automobile steer. Moreover, beyond a limited range, conventional two-wheel steering arrangements fail to turn the steering wheels into such relations to each other that they travel in concentric circles about a common turning point, as is desirable, thus tending to interfere with free turning of the truck and also to increase tire wear, especially if either or both of the steering wheels is also a tractor wheel.

The present invention aims particularly to provide a material handling truck in which two steering wheels, each preferably power driven to increase traction, are so interconnected through novel steering mechanism that not only can their effective steering range be made equal to or greater than that of the truck shown in the Patent 2,564,002, above referred to, but the steering movements of the combined steering and driving wheels will be so effected that, at each point in their joint steering movements, each wheel will be in a position to tend to turn the truck about the same point of turning as the other. In its broader aspects the invention is applicable to symmetrically located steering wheels, whether power-driven or not.

An important feature of the invention is the novel cam arrangement in the interconnection between the steering wheels or between the combined driving and steering wheels which makes possible the maintenance of the above-described relationship between the two wheels throughout a steering range of substantially 200°. Another important feature of the invention is the use of separately mounted driving means for the two driving or tractor wheels whereby each combined driving and steering wheel may be turned through an angle of substantially 200° without interfering with the other, except as herein provided for in their novel steering interconnection.

A further important feature of the invention is the mounting of the driving or tractor wheels and the driving means therefor in turrets turnable about vertical axes to effect the steering movements of the driving wheels and the arrangement of the steering interconnections between the turrets above the bearing connections of the turrets to the base frame in which the turrets turn for steering, thereby making the steering mechanism more accessible, simplifying the connections thereto and insuring a clear space between the turrets in which a storage battery may be located. This location of the storage battery is important not only to provide weight over the tractor wheels to insure traction but is also important when the automotive part of a truck having the novel steering mechanism of the present invention incorporated therein is made a part of a truck structure requiring considerable counterbalance for the load at some time during the handling thereof.

Other objects, important features and advantages of the invention, to which attention has not hereinabove specifically been directed, will appear hereinafter when the following description and claims are considered in connection with the accompanying drawings in which—

Figure 1 is a side elevation, with parts broken away to shows parts otherwise concealed, of a material handling truck embodying the present invention;

Figure 2 is a plan view of the truck shown in Figure 1;

Figure 3 is a plan view, on a somewhat larger scale, of the interconnections between the turnable supports for the combined steering and driving wheels by which the improved coordination of the steering movements of the said steering and driving wheels is brought about;

Figures 4, 5:
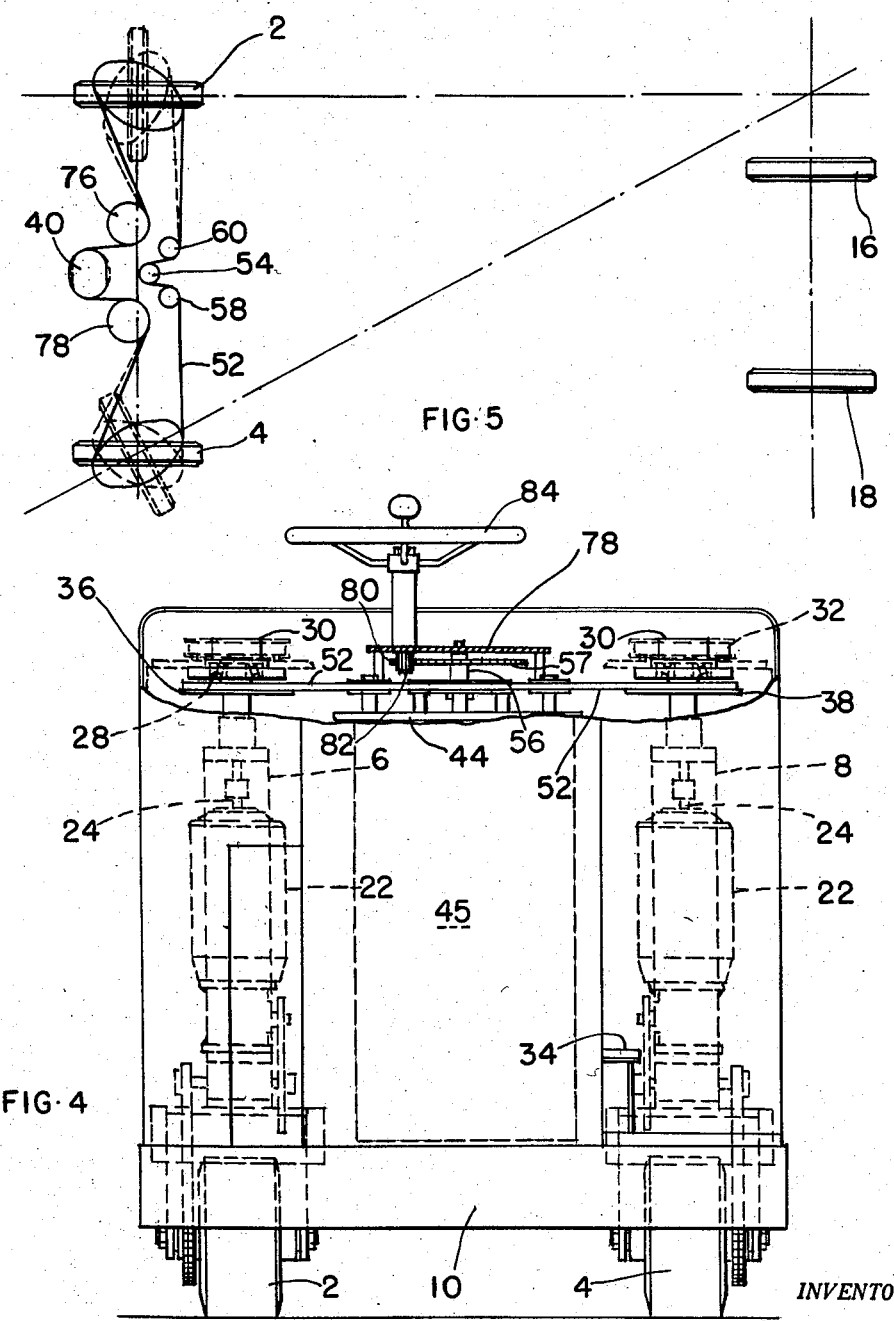
Figure 4 is a rear elevation of the truck, with a part of the casing broken away to show the steering mechanism.
Figure 5 is a diagrammatic view illustrating the steering effects obtained with the novel steering mechanism of the present invention.

As hereinabove suggested the material handling truck herein shown is designed to have the maneuverability and stability of the truck disclosed in Patent No. 2,564,002, above identified, but is also so designed as to provide considerably increased traction. To this end the illustrated truck is provided with two symmetrically located driving or traction wheels 2 and 4 having their bearings respectively in turrets 6 and 8 which are mounted to turn about vertical axes in bearings in a base frame 10. The construction of each of the turrets 6 and 8 and the manner of mounting in the base frame 10 may be substantially the same as the construction and mounting of the tractor wheel carrying and steering turrent shown in said Patent No. 2,564,002, above referred to.

To provide stability and suitable support for the load lifting mechanism, the base frame 10 is extended in front of the turrets 6 and 8, as, for example, by base fork members 12 and 14 having pairs of supporting wheels 16 and 18 near their front ends. As is usual in the design of power-driven material handling trucks, such as herein shown, the front or load-lifting part of the truck may vary widely in design and purpose, the automotive part of the truck being made as a separable unit having rigidly attached thereto a front plate 20 to which any suitable load lifting and supporting mechanism, such as that herein shown, may be attached to complete the material handling truck, the combined structure then having a common four-wheel-supported base frame.

As shown more particularly in Figure 4, each of the turrets 6 and 8 may be of a construction substantially identical with the turret shown in the Patent No. 2,564,002, each turret having therein an electric motor 22 for driving the associated tractor wheel 2 or 4 through suitable transmission connections, such as the speed-reducing gearing and sprocket chain connections shown in said patent. As also shown in said patent, the shaft 24 of each motor is arranged vertically and has a brake drum 30 thereon above the upper thrust bearings 28 of the associated turret. The brake drums 30 are embraced by brake shoes 32 which may be applied to exert simultaneous and suitable braking action on the drums 30 and thereby on the shafts 24 and the tractor wheels 2 and 4 connected thereto. The application of the brakes is brought about, as in said patent, the brake shoes 32 being normally spring-held in braking engagement with the drums 30 except when released by connections to a "dead man" treadle 34. Likewise, as in the truck shown in said patent, the motor operating circuit can only be closed when the "dead man" treadle is depressed to release the brakes.

In accordance with the present invention the steering movements of the driving or tractor wheels 2 and 4 are so coordinated that, at each stage of the steering swing of these wheels, each will travel in a circular path concentric with that in which the other travels, thereby avoiding any transverse drag of either wheel over the floor or other surface upon which the truck is traveling, with the resulting excessive tire wear. In order to maintain this relationship throughout a steering swing of substantially 200°, the steering connections between the tractor wheels 2 and 4 comprise three cams having their peripheries interconnected by a flexible but positive interconnection by which they may be caused to turn in unison but to varying extents, depending upon the cam shape, two of these cams, 36 and 38, being of substantially elliptical contour and being so attached to the turrets 6 and 8, respectively, as to turn therewith, the vertical axis of each turret passing substantially through the center of its associated cam. The third cam 40 is so located and of such peripheral contour that it compensates for any deviation of the steering swing of the tractor wheels 2 and 4 from the above defined relation to each other, which would result if reliance were placed solely upon a direct connection between the cams 36 and 38 which did not pass over the compensating cam 40. It will also be noted that the interposition of the compensating cam 40 in the connections between the cams 36 and 38 also prevents any backlash in the steering operation, an important consideration in a vehicle designed to operate in close quarters.

As herein shown, the cams 36 and 38 are attached to the respective turrets 6 and 8 at points below the upper or thrust bearings 28 for the turrets, but the cam 40 has its lower bearings in a plate 42 which, in turn, is adjustably attached to a plate 44 connected to the upright frame of the truck between the two turrets. The plate 44 may form a part of the top wall of a compartment for the storage battery 45, located between the turrets 6 and 8. Adjusting screws 46 serve to effect the desired adjustment of the plate 42 on plate 44 and lock screws 48 in slots 50 lock the plate 42 in its adjusted position.

The flexible but positive interconnection between the cams 36 and 38 may be, as herein shown, a sprocket chain 52, passing over a sprocket wheel 54 by which, as more fully hereinafter set forth, steering movement may be transmitted to the cams 36 and 38 from the operator-controlled steering handle or wheel. The sprocket wheel 54 is attached to the lower end of a shaft 56 and has a gear 57 connected to the upper end of a hub-like upward extension of said sprocket wheel 54. The sprocket chain 52 is held partially wrapped about the sprocket wheel 54 by idler sprockets 58 and 60, mounted on a plate 62 adjustable on the plate 44 by adjusting screws 64 and secured in adjusted position by locking screws 66. As it leaves the idler sprockets 58 and 60 the chain 52 is partially wrapped about the elliptical cams 36 and 38. To insure positive turning of the cams 36 and 38 by the chain 52 these cams may be provided respectively with lugs 70 and 72, each taking up the space of a chain link being connected to the interrupted chain respectively by bearing pins 67 and 68. Idler sprockets 74 and 76 hold the chain 52 in such relation both to the cams 36 and 38 and to the sprocket cam 40 that the desired cam and chain engagement is maintained throughout the steering range provided.

As shown in Figures 1 and 4, the sprocket carrying shaft 56 has its bearings on the upper side of a plate or crosshead 78 at one end and in the plate 44 at its other end. A pinion 80, carried by a shaft 82 extending through the cross-head 78 and having a hand wheel 84 at its upper end, engages the gear 57 and serves to transmit steering movement to the cams 36 and 38 through the sprocket 54, integral with gear 57, and the chain 52, thereby effecting the desired steering movements of the tractor wheels 2 and 4.

Since the above-described location of the storage battery between the turrets and extending somewhat behind them brings the center of gravity of the truck, at least when unloaded, close to a point over the tractor wheels 2 and 4, it is preferable to provide the truck with a stabilizing caster 86, which may be of the same construction as the articulated stabilizing caster of the parent above identified, except that it will be located behind the tractor wheels 2 and 4 and midway between the sides of the truck, as shown. It will be seen that the caster wheel 86 thus adds longitudinal stability to the truck, especially when carrying a light load or running unloaded.

The application of power to the tractor wheels to obtain the increased traction made possible by the novel truck design of the present invention and particularly to secure the desired cooperative tractive effort through the two wheels 2 and 4 may be brought about by simple electrical controls, not herein shown in detail but which will readily be understood from the following brief description. The electric motors 22 are preferably series wound and the switch box 88, with its operating handle 90, is preferably so connected to the fields and armatures of the motors that, when starting and for low speeds, the two motors 22 are connected in series so that both fields and both armatures are in a single series arrangement. For intermediate speeds the switching control is such that armatures remain connected in series but the fields are connected in parallel. For high speeds both the fields of the two motors and the armatures thereof are connected in parallel.

What is claimed as new is:

1. A material handling truck having, in combination, a base frame, supporting wheels therefor including two symmetrically located steering wheels, each carried by a support mounted on said base frame to swing for steering through an angle of substantially 200°, and steering connections between said wheel supports located above said wheels and comprising two substantially elliptical cams having periphery-engaging flexible but positive and in effect continuous interconnection, said cams being connected to the respective steering wheel supports to turn therewith about vertical axes respectively intersecting the axes of rotation of said steering wheels, and a third steer variation compensating and connection slack preventing cam located between the other two cams and having a substantial arc of its cam-shaped periphery engaged and positively turned by said flexible interconnection, said cams being so interrelated and so interconnected that, at any angle of steer within a range of substantially 200°, said wheels are turned for steering into such positively determined and controlled relations to each other that each travels in a steering circle concentric with that in which the other travels.

2. A material handling truck according to claim 1 in which an operator-controlled wheel in the plane of the three cams has a positive cam-operating connection to the positive but flexible interconnection between the said cams.

3. A material handling truck according to claim 1 in which the symmetrically located steering wheels are individually powered to serve as driving wheels but are arranged for simultaneous operation.

References Cited in the file of this patent

UNITED STATES PATENTS

| | | |
|---|---|---|
| 935,610 | Mauksch | Sept. 28, 1909 |
| 1,069,810 | Riemer | Aug. 12, 1913 |
| 1,828,905 | Mossay | Oct. 27, 1931 |
| 2,074,484 | Meehan | Mar. 23, 1937 |
| 2,470,496 | Krilanovich | May 17, 1949 |
| 2,516,074 | Remde | July 18, 1950 |
| 2,564,002 | Gibson | Aug. 14, 1951 |

FOREIGN PATENTS

| | | |
|---|---|---|
| 3,521 | Great Britain | 1875 |
| 560,112 | Great Britain | Mar. 21, 1944 |
| 819,640 | Germany | Nov. 5, 1951 |